United States Patent [19]

Schotter

[11] Patent Number: 5,226,615
[45] Date of Patent: Jul. 13, 1993

[54] AIR DAMPED LINEAR OPTICAL FIBER DISPENSER

[75] Inventor: Daniel K. Schotter, Tucson, Ariz.

[73] Assignee: Hughes Aircraft Company, Los Angeles, Calif.

[21] Appl. No.: 828,842

[22] Filed: Jan. 31, 1992

[51] Int. Cl.⁵ ............................................... F41G 7/32
[52] U.S. Cl. .................................................. 244/3.12
[58] Field of Search ..................................... 244/3.12

[56] References Cited

U.S. PATENT DOCUMENTS

| 5,052,636 | 10/1991 | Chesler | 244/3.12 |
| 5,058,969 | 10/1991 | Peterson et al. | 244/3.12 |
| 5,104,057 | 4/1992 | Chesler et al. | 244/3.12 |

Primary Examiner—Charles T. Jordan
Attorney, Agent, or Firm—R. M. Heald; C. D. Brown; W. K. Denson-Low

[57] ABSTRACT

An optical fiber canister (40) comprises a tapered cylindrical bobbin (42) having a length of optical fiber (28) wound thereon to form a fiber pack (43). The optical fiber (28) is wound so as to pay out with a preselected circumferential payout direction component (45), as well as a longitudinal payout direction component. The canister (40) has an optical fiber payout opening (50) through which the optical fiber (28) is paid out. An air duct (60, 62, 90) from the exterior of the canister (40) to the interior of the canister (40) has an air outlet (70) within the interior of the canister (40) oriented to direct the air flow oppositely to the preselected circumferential payout direction (45). The optical fiber canister (40) may be mounted within a missile (20), and the air duct (90) desirably extends from the exterior of the missile (20) to the interior of the canister (40), to provide a velocity-dependent air flow that damps out the helical motion of the optical fiber (28) during payout, permitting the optical fiber (28) to be paid out smoothly even though the payout opening (50) is small.

16 Claims, 3 Drawing Sheets

AIR DAMPED LINEAR OPTICAL FIBER DISPENSER

BACKGROUND OF THE INVENTION

This invention relates to optical fibers, and, more particularly, to a canister system for dispensing optical fibers linearly.

Optical fibers are strands of glass fiber processed so that light transmitted therethrough is subject to total internal reflection. A large fraction of the incident intensity of light directed into the optical fiber is received at the other end of the optical fiber, even though the optical fiber may be hundreds or thousands of meters long. Optical fibers have shown great promise in communications applications, because a high density of information may be carried along the optical fiber and because the quality of the signal is less subject to external interferences of various types than are electrical signals carried on metallic wires. Moreover, the glass fibers are light in weight and made from a highly plentiful substance, silicon dioxide.

Glass optical fibers are typically fabricated by preparing a preform of glasses of two different optical indices of refraction, one inside the other, and processing the preform to a fiber. The optical fiber is coated with a polymer layer termed a buffer to protect the glass from scratching or other damage. As an example of the dimensions, in a typical configuration the diameter of the glass optical fiber is about 125 micrometers, and the diameter of the optical fiber plus the polymer buffer is about 250 micrometers (approximately 0.010 inch).

For such very fine optical fibers, the handling of the optical fiber to avoid damage that might reduce its mechanical strength and/or light transmission properties becomes an important consideration. In one approach, the optical fibers are wound in a winding direction onto a cylindrical or tapered cylindrical bobbin (collectively termed herein a "tapered" bobbin even though the angle of the taper may be zero) with many turns adjacent to each other in a side-by-side fashion. After one layer is complete, another layer of optical fiber is laid on top of the first layer, and so on. A weak adhesive is typically applied to the layers of optical fiber, to hold them in place. The final assembly of the bobbin and the wound layers of optical fiber is termed a canister, and the mass of wound optical fiber is termed the fiber pack. When the optical fiber is later to be used, the fiber is paid out from the canister in a direction generally parallel to the axis of the cylinder.

As the optical fiber is paid out from the canister, it naturally follows a helical pattern because the optical fiber continuously unwinds from the bobbin. In some instances, the helical component to the payout of the optical fiber can be undesirable. For example, if the optical fiber is to be dispensed through a tube or opening in the canister wall of small diameter located a few centimeters from the bobbin, the helical motion can cause the optical fiber to rub against the entry of the tube, with possible damage to the optical fiber. In another example, the helical pattern can produce an increased radar signature, which is undesirable if the optical fiber is being dispensed from a missile in flight.

There is therefore a need for a technique to damp out the helical motion of the optical fiber as it is dispensed from the bobbin in a direction generally parallel to the axis of the bobbin. The approach must be compatible with other aspects of the storage and use of the optical fiber, such as long storage life in a variety of conditions. Also, the damping would desirably vary according to the rate of dispensing, so that more damping is available for increased dispensing rates. The present invention fulfills this need, and further provides related advantages.

SUMMARY OF THE INVENTION

The present invention provides an optical fiber canister and related structure which linearly dispenses optical fiber from a bobbin in a manner such that the helical component of the motion of the optical fiber adjacent to the bobbin is rapidly damped. The optical fiber therefore dispenses linearly even near the bobbin and canister. As a result, the optical fiber can be dispensed through small openings or tubes placed close to the bobbin. The radar signature due to the helical pattern is also reduced. When the approach of the invention is used with a canister in a missile, the damping forces increase with increasing speed of the missile.

In accordance with the invention, an optical fiber canister comprises a tapered cylindrical bobbin having a length of optical fiber wound thereon, the optical fiber being wound so as to pay out with a preselected circumferential payout directional component. A canister housing surrounds the bobbin and has an optical fiber payout opening therein. An air duct extends from the exterior of the canister to the interior of the canister, the air duct having an air outlet within the interior of the canister oriented to direct the air flow oppositely to the preselected circumferential payout directional component.

In another aspect, an optical fiber canister comprises a tapered cylindrical bobbin having a length of optical fiber wound thereon in a circumferential winding direction, and an air duct having an air outlet oriented to direct a flow of air over the surface of the bobbin in its circumferential winding direction. In this embodiment, since the optical fiber is dispensed with a circumferential or helical component of motion opposite to the circumferential winding direction, the flow of air from the duct is opposite to the circumferential payout direction.

A flow of air is used to reduce the circumferential component of the kinetic energy of the optical fiber as it dispenses. Reducing the circumferential component of the kinetic energy of the optical fiber causes the helical pattern to collapse inwardly toward the axis of the bobbin, aiding in the linear dispense of the optical fiber. Stated alternatively, the air flow forces the helix to smaller diameters than it would exhibit absent the damping. The reduction of the helical diameter facilitates the dispensing or payout of the optical fiber through a duct or opening, and also results in reduced radar signature produced by the helix itself.

This invention provides an advance in the art of optical fiber dispensers. With the approach of the invention, the optical fiber can be directed through a small opening or duct positioned closely to the bobbin, without damaging the fiber. Other features and advantages of the invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
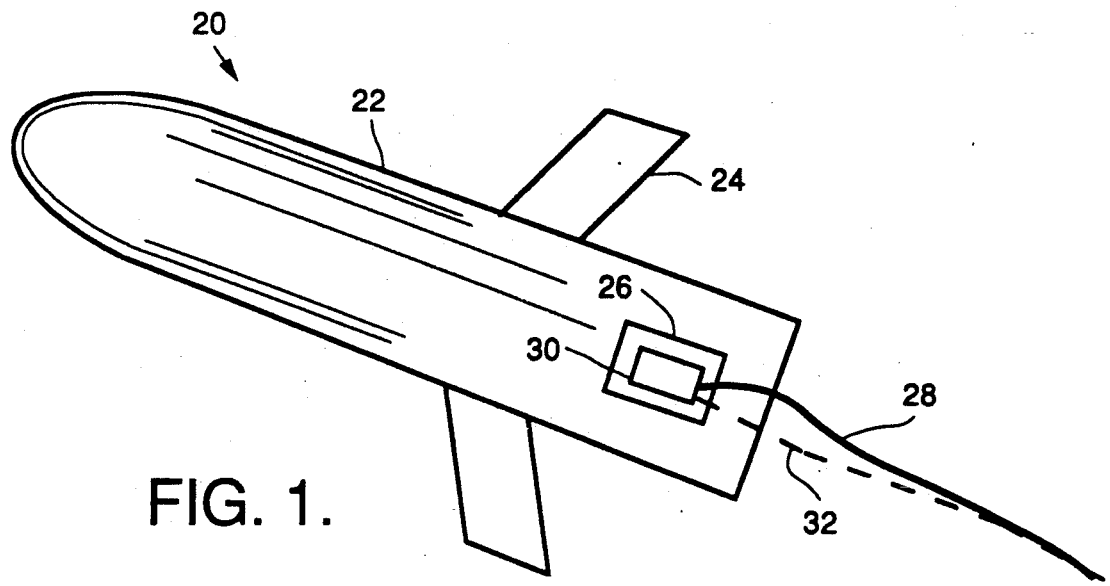
FIG. 1 is a perspective view, with a portion of the external skin broken away, of a missile that carries an optical fiber canister.

One use of the present invention is with a missile that is guided by signals sent through an optical fiber. Such a missile 20 is illustrated in FIG. 1. The missile 20 has an aerodynamic skin 22 and control surfaces 24. An optical fiber canister 26 is mounted within the aerodynamic skin 22. An optical fiber 28 is dispensed from the canister 26, and extends rearwardly of the missile 20 to a control station (not shown), where a missile controller is located.

Within the canister 26, the optical fiber 28 is wound onto a bobbin 30, which is cylindrical or slightly tapered. The optical fiber 28 is dispensed from the bobbin 30 and the canister 26 along the cylindrical axis of the bobbin. Because the optical fiber 28 is wound upon the bobbin 30 circumferentially, the point at which the optical fiber 28 leaves the bobbin 30, called the "peel point", moves around the circumference of the bobbin 30 in a direction opposite to the direction of winding. The optical fiber 28 therefore traces a helical path 32 during payout. Even where the optical fiber 28 is passed through a central cavity of the bobbin, as will be discussed in greater detail subsequently, the path of the optical fiber 28 will "balloon" outwardly to define the helical path 32.

The helical path 32 or ballooning is undesirable, for several reasons. It has an increased radar signature, reducing the stealth characteristics of the missile. The helical path requires that the canister 26 be mounted within the tail of the missile 20, to permit the helical path 32 to form outside the body of the missile 20. The approach of FIG. 1 therefore cannot be used for powered missiles having aft-mounted, on-axis launch or flight motors. It also prevents the optical fiber 28 from being passed through small holes or tubes to remote locations away from the canister prior to leaving the missile.

The present invention reduces the tendency of the optical fiber 28 to follow a helical path 32 of extended diameter, as the optical fiber is dispensed.

Figure 2:
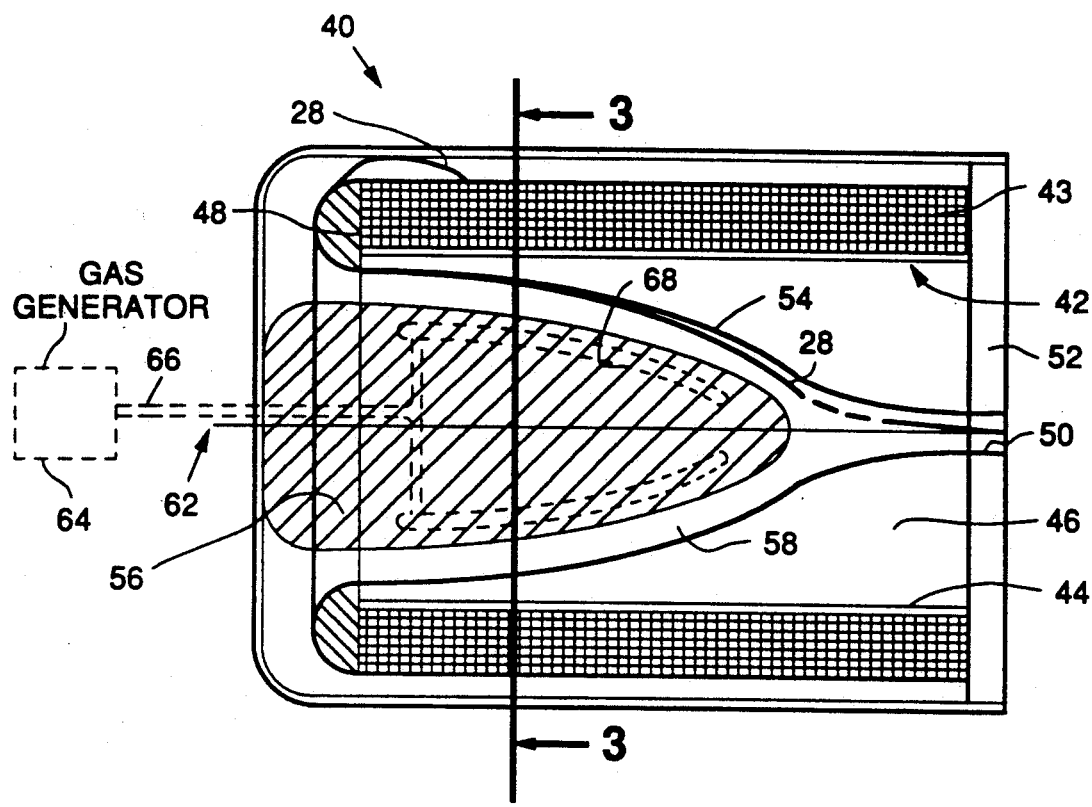
FIG. 2 is a side sectional view of an optical fiber canister according to the present invention.
Figure 3:
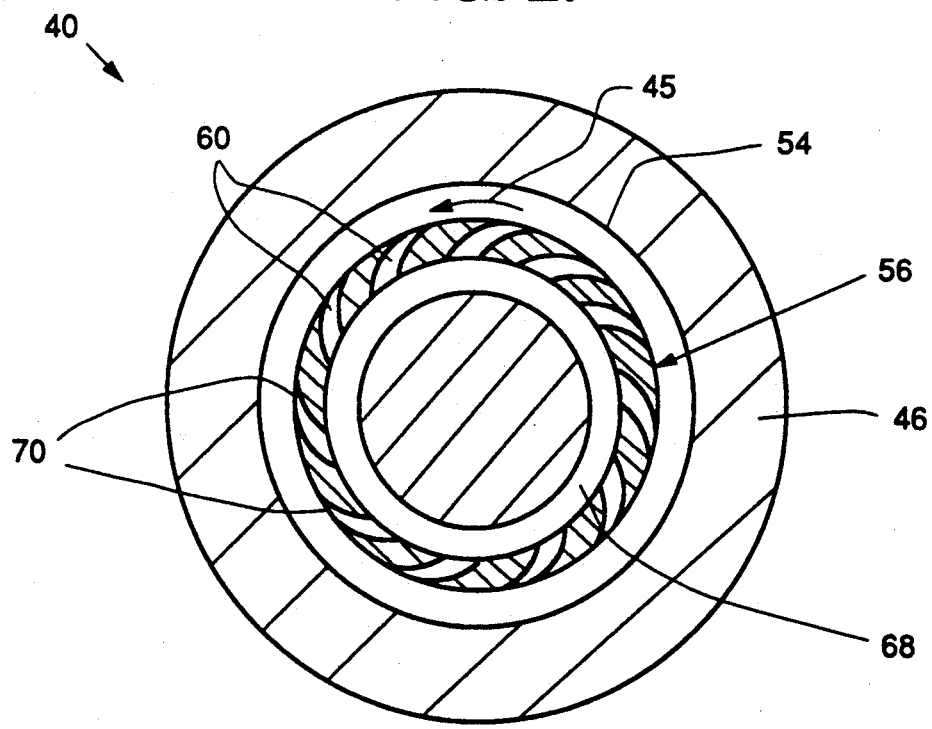
FIG. 3 is a sectional view of the canister of FIG. 2, taken along line 3—3.

FIGS. 2 and 3 illustrate one preferred form of the invention. An optical fiber canister 40 includes a bobbin 42 that is either cylindrical or tapered cylindrical in form, with the taper being less than about 5 degrees. For convenience, the term "tapered cylindrical" is used herein to include a cylindrical or tapered cylindrical bobbin with a small taper angle typically less than about 5 degrees. A plurality of layers of optical fiber 28 are wound onto the bobbin 42, in the form of a fiber pack 43. The optical fiber 28 is wound onto the bobbin 42 in a winding direction, and is unwound so that it follows a circumferential payout direction 45.

The bobbin 42 is formed as a tapered cylindrical shell 44 with a shaped insert 46 supported within the center of the shell 44. The insert 46 is shaped such that it has a large diameter at a forward end 48 of the bobbin 42, and has a small diameter to define an exit opening 50 at a rear end 52 of the bobbin 42. An interior wall 54 of the insert 46 guides the optical fiber 28 toward the exit opening 50.

A central housing 56 fits within the cylindrical shell 44, filling a portion of the space remaining within the shell 44 not filled by the insert 46. The insert 46 and the housing 56 are dimensioned so as to leave a dispensing gap 58, through which the optical fiber 28 is dispensed to the exit opening 50, between the interior wall 54 of the insert 46 and the housing 56.

The particular bobbin 42 in FIGS. 2 and 3 is a center-feed bobbin, with the optical fiber passing through the interior of the bobbin as it is dispensed. This produces a compact design that saves space in the missile. The present invention is also applicable to external-feed bobbins, where the optical fiber does not pass through the interior of the bobbin as it is dispensed. Such bobbins require more space within the missile because of the need for placement of the insert and central housing, or comparable structure, in line axially with the bobbin to control the path of the optical fiber, but may be useful for some applications.

An air duct 60 is located within the central housing 56. In the illustrated preferred form, a plurality of air ducts 60 are provided. Each air duct 60 is supplied with a flow of pressurized air or other gas from a source 62. In the embodiment of FIGS. 2 and 3, the source 62 includes a gas generator 64 mounted within the body of the missile 20, a pressurization line 66 leading to the central housing 56, and a gas plenum 68 that connects to the ducts 60. The source may also be an air duct that conducts air from the exterior of the missile to the canister, as will be described in conjunction with the embodiment of FIGS. 4 and 5.

Pressurized gas from the source 62 is directed from each duct 60 through an air outlet 70, preferably a plurality of air outlets 70. The air outlets 70 are angled so that the air flow from the duct 60 enters the dispensing gap 58 in a direction that is in opposition to the payout direction 45. Preferably, the air flow from the air outlets 70 is directed generally tangentially to the surface of the central housing 56, and thence circumferential to the bobbin 42 and canister 40. The air flow from the air outlets 70 serves to reduce the circumferential component of kinetic energy in the optical fiber 28, thereby reducing its circumferential velocity and easing its passage through the exit opening 50. (This approach can be used in conjunction with an exit tube, as described subsequently.)

Figure 4:
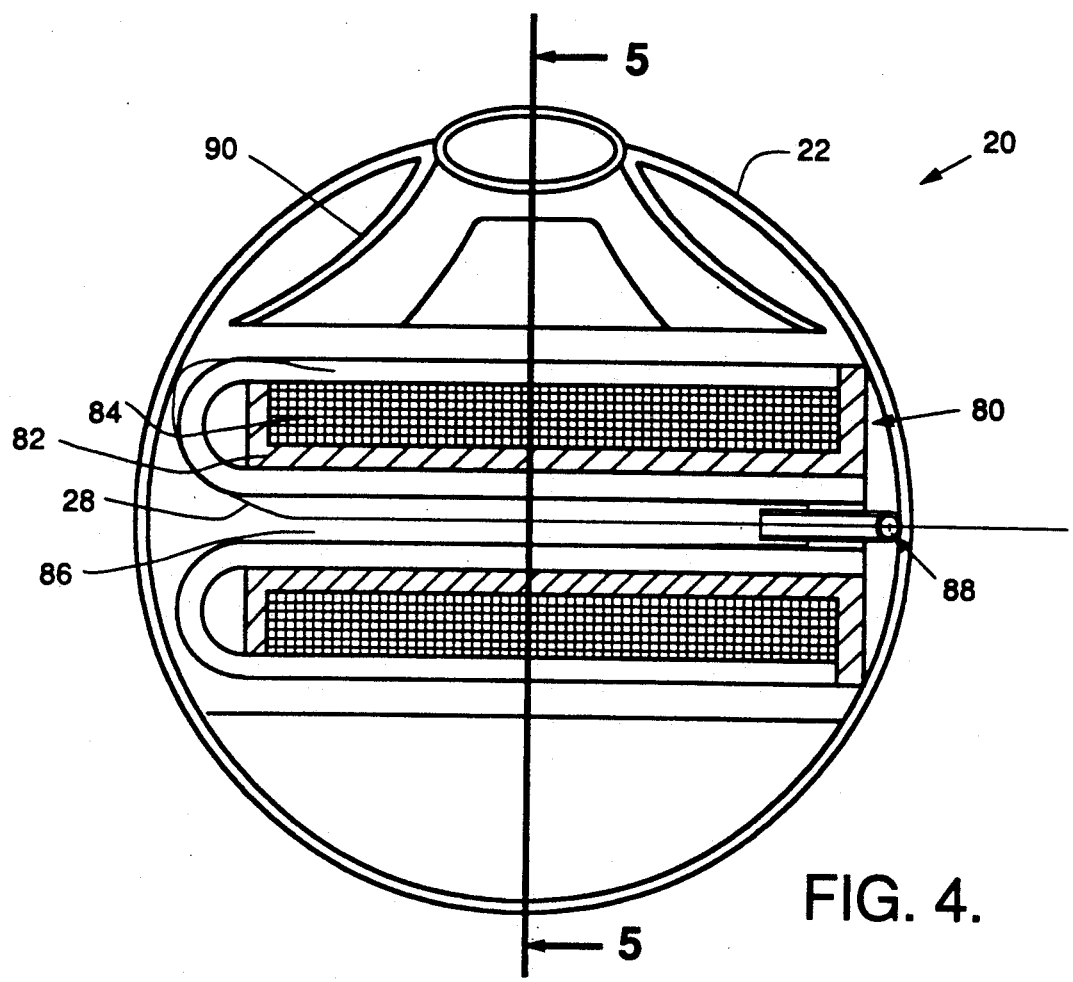
FIG. 4 is a side sectional view of another embodiment of optical fiber canister according to the invention.
Figure 5:
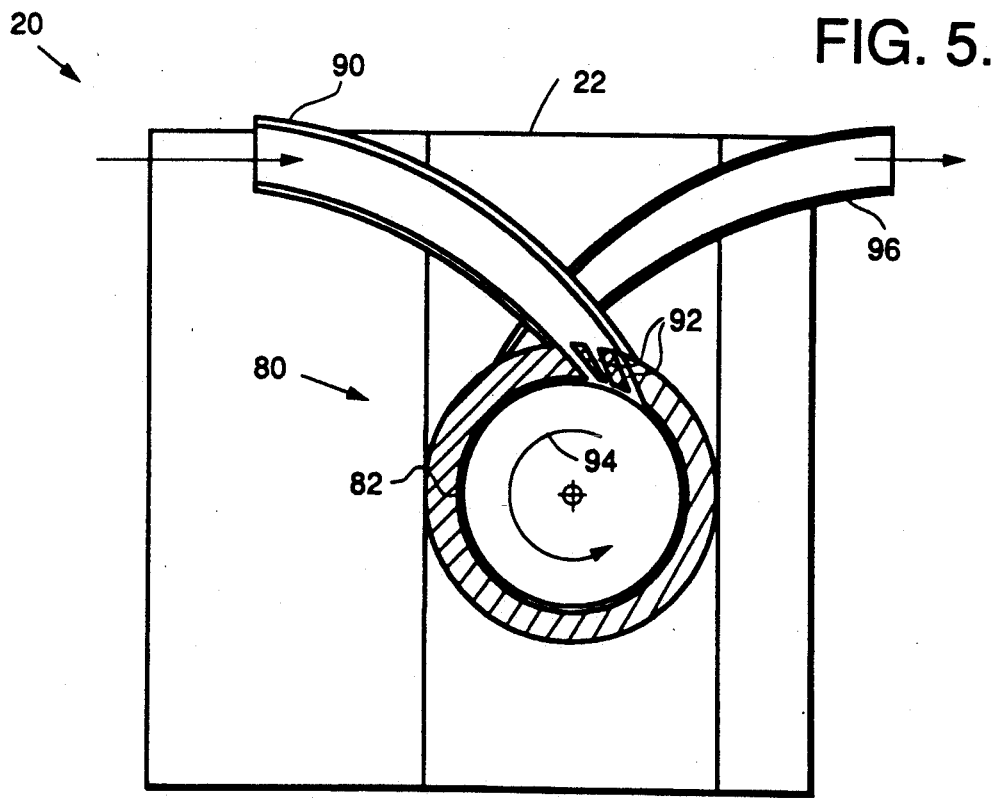
FIG. 5 is a sectional view of the canister of FIG. 4, taken along line 5—5.

Another embodiment is illustrated in FIGS. 4 and 5. In this embodiment, a canister 80 is mounted inside the aerodynamic skin 22 of the missile 20. The canister 80 has a hollow bobbin 82 with a fiber pack 84 wound thereon. During the dispensing of the optical fiber, optical fiber 28 is paid out from the fiber pack 84, conducted through a hollow interior 86 of the bobbin 82, and passed through an exit tube 88 at the end of the hollow interior 86. In this case, the canister 80 is illustrated as mounted transverse to the direction of flight, and the exit tube 88 has a right angle bend to turn the direction of the optical fiber by 90 degrees so that it can be dispensed rearwardly as the missile flies.

An air duct 90 extends from a location exterior to the canister 80, and preferably from a location exterior to the skin 22 of the missile 20, to a location in the interior of the canister 80. The air duct 90 terminates in a series of air outlets 92 through the outer wall of the canister 80. The air ducts 90 are positioned to direct a flow of air in a direction opposite to a circumferential payout direction 94 (which is itself opposite to the direction in which the optical fiber is wound upon the bobbin 82), preferably generally tangentially to the circumferential direction of the bobbin 82 for maximum effectiveness. The flow of air reduces the circumferential component of the kinetic energy of the optical fiber, thence reducing its circumferential velocity and its tendency to form a large diameter helix. The absence of the payout helix permits the optical fiber 28 to be dispensed smoothly through the hollow interior 86 of the bobbin 82, and through the exit tube 88 to be turned through 90 degrees. The velocity of the air passing through the air duct 90 and thence the air outlets 92 is dependent upon the speed of movement of the missile 20 through the air. An exit duct 96 conducts air away from the canister 80.

One potential problem with the embodiment of FIGS. 4 and 5 is that the flow of air from the duct 90 can force the optical fiber down against the surface of the bobbin 82. The result is that the payout force may be increased, generally an undesirable result because it increases the risk of breakage of the optical fiber. For this reason, in normal practice the air flow to the external surface of the bobbin 82 would be restricted to a sufficiently low volume that payout forces are not unacceptably increased, by restricting the size of the air duct. Used by itself, the embodiment of FIGS. 4 and 5 is normally less preferred than the embodiment of FIGS. 2 and 3. Also, in some instances it may be desirable to combine the two approaches, so that the canister has an insert/central housing damping structure as in the embodiment of FIGS. 2 and 3, and also a smaller degree of external surface damping as in the embodiment of FIGS. 4 and 5.

The excess of air or other gas supplied to the interior of the canister 40 or the canister 80 thus reduce the circumferential kinetic energy of the optical fiber during fiber dispensing. Additionally, the excess air can act as a lubricant, in the nature of an air bearing, to reduce the incidence and magnitude of any friction between the optical fiber and the walls of the exit opening or tube through which the optical fiber is conducted.

Figure 6:
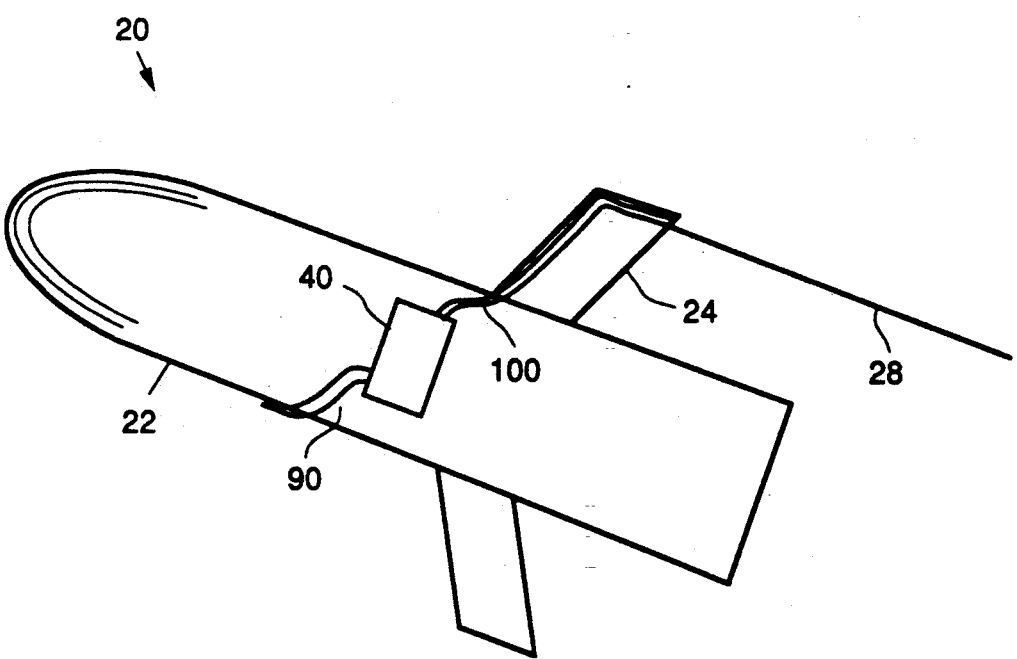
FIG. 6 is a perspective view like that of FIG. 1, except that the missile carries an optical fiber canister according to the present invention.

FIG. 6 illustrates an application of the optical fiber dispensing system of the invention. The canister 40 (or 80) is mounted transversely to the body of the missile 20. In this case, the air duct 90 extends from the interior of the canister 40 to the exterior of the missile 20, in the manner discussed for the embodiment of FIGS. 4 and 5. (Alternatively, an internal gas source such as described for the embodiment of FIGS. 2 and 3 may be used.) The optical fiber 28 is paid out of the canister 40 through a long exit tube 100, whose inner diameter is typically at least about three times the diameter of the optical fiber 28. The exit tube 100 passes through the control surface 24 and to a rear edge of the control surface 24, at which location the optical fiber enters the air stream. The capability to conduct the optical fiber 28 to a release point laterally separated from the body of the missile 20 permits the rocket motor of the missile 20 to be placed in the tail of the missile, yet avoid damage to the optical fiber from the exhaust plume of the engine. Without the ability to conduct the optical fiber to such a lateral position, rocket motors would otherwise be placed on the sides of the missile. The ability to pass the optical fiber through the exit tube in turn requires the damping of the helical component to the payout velocity, as disclosed herein.

The approach of the invention permits an optical fiber to be dispensed from a canister with little or no helical component to its velocity, an important advantage for many missile applications. Although particular embodiments of the invention have been described in detail for purposes of illustration, various modifications may be made without departing from the spirit and scope of the invention. Accordingly, the invention is not to be limited except as by the appended claims.

What is claimed is:

1. An optical fiber canister, comprising:
    a tapered cylindrical bobbin having a length of optical fiber wound thereon, the optical fiber being wound so as to pay out with a preselected circumferential payout directional component;
    a canister housing surrounding the bobbin and having an optical fiber payout opening therein; and
    a gas duct extending from the exterior of the canister to the interior of the canister, the gas duct having a gas duct outlet within the interior of the canister oriented to direct the gas flow oppositely to the preselected circumferential payout directional component.

2. The canister of claim 1, wherein the angle of taper of the cylindrical bobbin is from 0 to about 5 degrees.

3. The canister of claim 1, further including
    an exit tube through which the optical fiber passes upon payout, the exit tube extending from the optical fiber payout opening of the canister housing.

4. The canister of claim 1, wherein the gas duct outlet directs the air flow over the surface of the bobbin in the circumferential direction of the bobbin.

5. The canister of claim 1, further including
    a source of gas that supplies a flow of gas to the gas duct.

6. The canister of claim 5, wherein the source of gas is a gas generator.

7. An optical fiber canister, comprising:
    a tapered cylindrical bobbin having a length of optical fiber wound thereon, the optical fiber being wound so as to pay out with a preselected circumferential payout directional component;
    a canister housing surrounding the bobbin and having an optical fiber payout opening therein;
    means for guiding the optical fiber through a dispensing gap wherein the optical fiber follows a helical pattern with a circumferential component of motion; and
    an air duct extending from the exterior of the canister to the interior of the canister, the air duct having an air outlet within the interior of the canister oriented to direct a flow of air into the dispensing gap in a direction opposite to the preselected circumferential payout directional component of motion of the optical fiber passing through the dispensing gap.

8. The canister of claim 7, further including
    an exit tube through which the optical fiber passes after passing through the dispensing gap.

9. The canister of claim 7, wherein the means for guiding the optical fiber through a dispensing gap comprises a shaped outer member having a central volume with a large size at a first end and a smaller size at a second end thereof, and a central member located within the central volume of the shaped, outer member with the dispensing gap formed by confronting surfaces of the central member and the shaped outer member.

10. The canister of claim 9, wherein at least a portion of the air duct is located within the central member.

11. The canister of claim 9, wherein the tapered cylindrical bobbin is hollow, and the shaped outer member is formed as an insert with the bobbin.

12. The canister of claim 7, further including
a source of air that supplies a flow of air to the air duct.

13. A missile, comprising:
an aerodynamic skin;
an optical fiber canister mounted within the aerodynamic skin, the canister including
a tapered cylindrical bobbin having a length of optical fiber wound thereon, the optical fiber being wound so as to pay out with a preselected circumferential payout directional component,
a canister housing surrounding the bobbin and having an optical fiber payout opening therein; and
an air duct extending from the exterior of the canister to the interior of the canister, the air duct having an air outlet within the interior of the canister oriented to direct an air flow oppositely to the preselected circumferential payout directional component.

14. The missile of claim 13, wherein the air duct extends from the exterior of the aerodynamic skin to the interior of the canister.

15. The missile of claim 13, further including
a source of gas that supplies a flow of gas to the air duct.

16. The missile of claim 13, further including
an exit tube through which the optical fiber passes after passing through the payout opening.

* * * * *